US012219909B2

(12) United States Patent
Greenes et al.

(10) Patent No.: US 12,219,909 B2
(45) Date of Patent: Feb. 11, 2025

(54) MODULAR PLANTER BOX

(71) Applicants: Larry Greenes, Bedford Heights, OH (US); Dwaine Mellon, Carney, MI (US)

(72) Inventors: Larry Greenes, Bedford Heights, OH (US); Dwaine Mellon, Carney, MI (US)

( * ) Notice: Subject to any disclaimer, the term of this patent is extended or adjusted under 35 U.S.C. 154(b) by 26 days.

(21) Appl. No.: 18/054,972

(22) Filed: Nov. 14, 2022

(65) Prior Publication Data

US 2024/0155979 A1    May 16, 2024

(51) Int. Cl.
*A01G 9/02*    (2018.01)

(52) U.S. Cl.
CPC ...................................... *A01G 9/02* (2013.01)

(58) Field of Classification Search
CPC ...... A01G 9/02; A01G 2009/003; A01G 9/28; A01G 9/00; A01G 9/023; A01G 9/025; A01G 9/026; A01G 9/029; A01G 9/0295; B65D 11/1866; B65D 11/1873; B65D 9/12
USPC ........................................ 220/4.28, 4.31, 625
See application file for complete search history.

(56) References Cited

U.S. PATENT DOCUMENTS

| | | | | |
|---|---|---|---|---|
| 242,026 | A * | 5/1881 | O'Connor | B65D 9/12 217/12 R |
| 1,803,385 | A * | 5/1931 | Finnegan | B65D 9/12 217/12 R |
| 1,898,297 | A * | 2/1933 | Barcley | A63H 33/105 446/105 |
| 2,593,779 | A * | 4/1952 | McGrath | B65D 9/32 217/65 |
| 4,232,916 | A * | 11/1980 | Correia | A47B 87/0207 312/265.5 |
| 6,497,018 | B1 * | 12/2002 | Chiu | A61G 17/004 220/4.28 |
| 9,592,931 | B2 * | 3/2017 | Woodruff | B65D 25/06 |
| D890,017 | S * | 7/2020 | Draeger | D11/143 |
| 2014/0190077 | A1 * | 7/2014 | Burmann | B65D 19/42 220/4.01 |
| 2017/0215345 | A1 * | 8/2017 | Penterman | A01G 9/28 |

* cited by examiner

*Primary Examiner* — Ebony E Evans
*Assistant Examiner* — Katelyn T Truong
(74) *Attorney, Agent, or Firm* — Chrisman Gallo Tochtrop LLC

(57) ABSTRACT

A modular planter box defining a storage cavity therein that is configured to receive a planting medium, the modular planter box including a first side-wall extending longitudinally in a first direction and having a bottom end configured to rest on a supporting surface, a second side-wall extending longitudinally in a second direction, and a bottom wall residing on an imaginary plane. The second side-wall extends in a third direction that is normal to the imaginary horizontal plane. The bottom wall is spaced from a bottom end of the first side-wall in the third direction and towards an opposite, top end of the first side-wall. The second side-wall is positioned closer to a first end of the first side-wall than a second end thereof, and the second side-wall is spaced from the first end of the first side-wall in the first direction and towards the second end of the first side-wall.

14 Claims, 6 Drawing Sheets

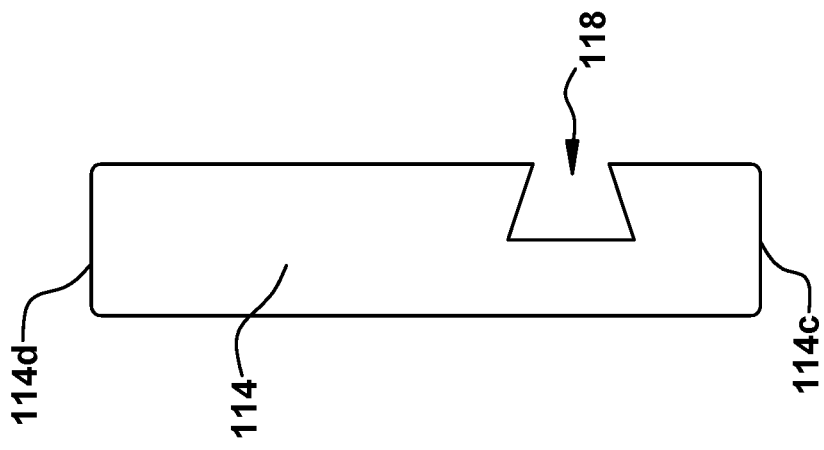
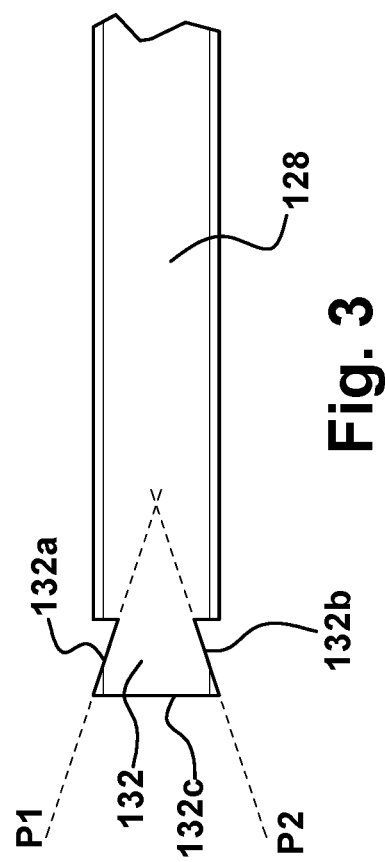

MODULAR PLANTER BOX

FIELD OF THE INVENTION

This application relates generally to a planter box for storing soil, plants, fruits, vegetables, etc., therein, and more particularly, a planter box having a modular configuration for fast and simple assembly and that permits user adjustability with respect to desired dimensions.

BACKGROUND OF THE INVENTION

Conventional planter boxes are designed with specific dimensions that are not adjustable by an end user. That is, if a user purchases one planter box having a specific set of dimensions and subsequently desires a planter box with a different set of dimensions, the user is then required to purchase a completely separate planter box having those desired dimensions. Moreover, conventional planter boxes can be shipped from the manufacturer in a fully assembled state. This requires the overall packaging of the assembled planter box to be bulky. Alternatively, conventional planter boxes can be shipped in an unassembled state, thus requiring the user to complete assembly, which generally requires the use of tools and/or fasteners.

BRIEF SUMMARY OF THE INVENTION

In accordance with one aspect, there is provided a modular planter box including a first side-wall extending longitudinally in a first direction and having a bottom end configured to rest on a supporting surface. A second side-wall extends longitudinally in a second direction. The second direction is perpendicular to the first direction. A third side-wall is spaced from the first side-wall and extends longitudinally in the first direction. A fourth side-wall is spaced from the second side-wall and extends longitudinally in the second direction. A bottom wall resides on an imaginary horizontal plane. The second side-wall extends in a third direction that is normal to the imaginary horizontal plane. The first side-wall, the second side-wall, the third side-wall, the fourth side-wall, and the bottom wall collectively define a storage cavity configured to receive a planting medium therein. The bottom wall spans between and is removably connected to the first side-wall and the third side-wall. Further, the second side-wall and the fourth side-wall span between and are removably connected to the first side-wall and the third side-wall. The bottom wall is spaced from the bottom end of the first side-wall in the third direction and towards an opposite, top end of the first side-wall.

In accordance with another aspect, there is provided a modular planter box defining a storage cavity therein that is configured to receive a planting medium. The modular planter box includes a first side-wall extending longitudinally in a first direction and including a base plank and a top plank. The base plank is configured to rest on a supporting surface and the top plank is provided vertically above the base plank. A second side-wall extends longitudinally in a second direction. The second direction is perpendicular to the first direction. The second side-wall includes a base board and a top board, the top board being disposed vertically above and resting on the base board. A bottom wall resides on an imaginary horizontal plane. The base board rests on a top surface of the bottom wall and extends in a third direction that is normal to the imaginary horizontal plane. The base plank includes a first groove and a second groove formed therein. The first groove extends longitudinally in the first direction from a first lateral end to a second lateral end of the base plank. The second groove extends longitudinally in the third direction from a bottom edge to an opposite top edge of the base plank. The second groove crosses over the first groove in a perpendicular manner.

The top plank includes a third groove formed therein. The third groove extends longitudinally in the third direction and is vertically aligned with the second groove. The bottom wall has a first protrusion formed at an end thereof. The first protrusion is slidably received within the first groove to removably connect the bottom wall to the first side-wall. The base board has a second protrusion formed at an end thereof. The second protrusion is slidably received within the second groove and the third groove. The top board has a third protrusion formed at an end thereof. The third protrusion is slidably received within the third groove.

The bottom edge of the base plank is configured to rest on the supporting surface. The bottom wall is spaced from the bottom edge of the base plank in the third direction and towards the top edge of the base plank. The second side-wall is positioned closer to the first lateral end of the base plank than the second lateral end of the base plank, and the second side-wall is spaced from the first lateral end of the base plank in the first direction and towards the second lateral end of the base plank.

BRIEF DESCRIPTION OF THE DRAWINGS

FIG. 3 is a partial, cross-sectional view of a board of the second side-wall, shown in FIG. 2;

FIG. 4 is a cross-sectional view of a plank of the first side-wall, shown in FIG. 2;

DESCRIPTION OF EXAMPLE EMBODIMENTS

Figure 1:
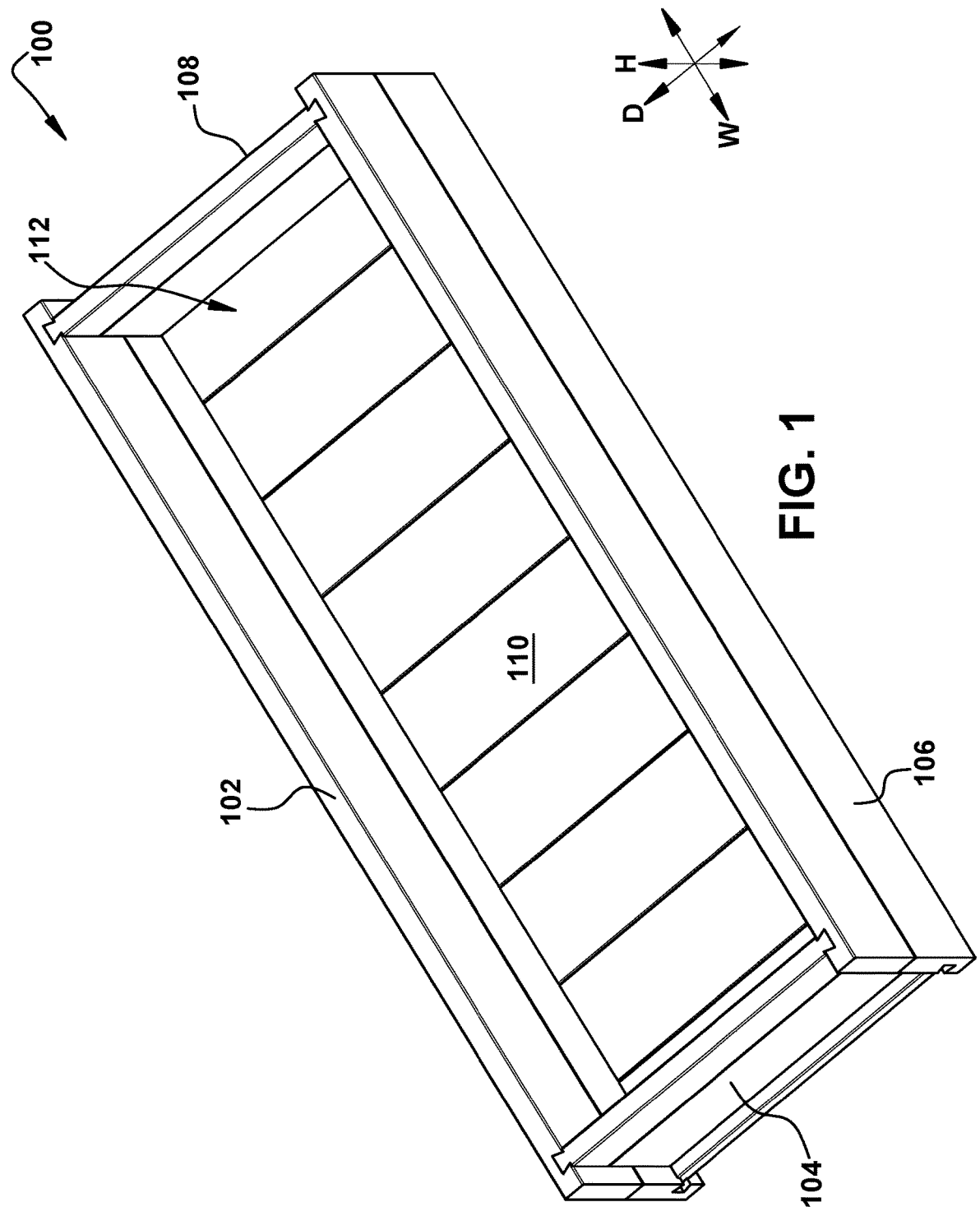
FIG. 1 is a perspective view of an opened-top, modular planter box having a first side-wall, a second side-wall, a third side-wall, a fourth side-wall, and a bottom wall that collectively define a storage cavity.

Referring now to the drawings, FIG. 1 shows an opened-top, planter box 100 that includes a first side-wall 102, a second side-wall 104, a third side-wall 106, a fourth side-wall 108, and a bottom wall 110 that collectively define a storage cavity 112. Notably, as will be further described below, the planter box 100 is modular in design, such that various dimensions thereof are adjustable. The first, second, third, and fourth side-walls 102, 104, 106, 108, and the bottom wall 110 can all be made of the same material (e.g., wood); however, it is contemplated that at least some of said walls can be made of different materials (e.g., metal, plastic, etc.). Notably, the first and third side-walls 102, 106 oppose one another, and the second and fourth side-walls 104, 108 likewise oppose one another. The first and third side-walls 102, 106 are oriented parallel with respect to one another and extend longitudinally in a first direction (i.e., a width direction 'W') of the planter box 100. Further, the second and fourth side-walls 104, 108 are oriented parallel with respect to one another and extend longitudinally in a second direction (i.e., a depth direction 'D') of the planter box 100.

As shown in FIG. 1, the first and third side-walls 102, 106 can be arranged perpendicular to the second and fourth side-walls 104, 108 such that the planter box 100 has a rectangular shape in cross-section. However, it is contemplated that the planter box 100 may have other shapes in cross-section (e.g., square, rhombus, trapezoid, etc.). The first, second, third, and fourth side-walls 102, 104, 106, 108 collectively define a continuous, inner side-surface that partially bounds the storage cavity 112 (i.e., bounds the storage cavity 112 in the width 'W' and depth 'D' directions). The bottom wall 110 resides on an imaginary horizontal plane (i.e., defined by the width 'W' and depth 'D' directions) and defines a bottom surface of the storage cavity 112. That is, the bottom wall 110 is perpendicular to the first, second, third, and fourth side-walls 102, 104, 106, 108 and bounds the storage cavity 112 in a third direction (i.e., a height direction 'H') of the planter box 100.

The storage cavity 112 is configured to receive a planting medium (e.g., soil) therein for plants (e.g., flowers, herbs, fruits, vegetables, etc.) growing within the planter box 100. However, it is further contemplated that the storage cavity 112 may receive other mediums therein (e.g., rocks, woodchips, etc.). Further, a liner may be disposed within the storage cavity 112 and disposed between inner surfaces of the storage cavity 112 and the planting medium. Such liners are generally configured to help the planting medium retain moisture. Moreover, while the planter box 100 is shown as having an opened-top configuration (i.e., no obstructions at a top of the planter box 100 such that the storage cavity 112 is readily accessible from the top of the planter box 100 at all times), it is contemplated that the storage cavity 112 may be selectively closed. For example, in one embodiment, a separate (i.e., completely removable) lid (not shown) may be provided wherein said lid can be removably positioned on the planter box 100 so as to engage respective (top) surfaces of the first, second, third, and/or fourth side-walls 102, 104, 106, 108 in order to enclose the storage cavity 112. In an alternative embodiment, a lid (not shown) can be hingedly connected to one of the first, second, third, or fourth side-walls 102, 104, 106, 108 to selectively enclose the storage cavity 112.

Figure 2:
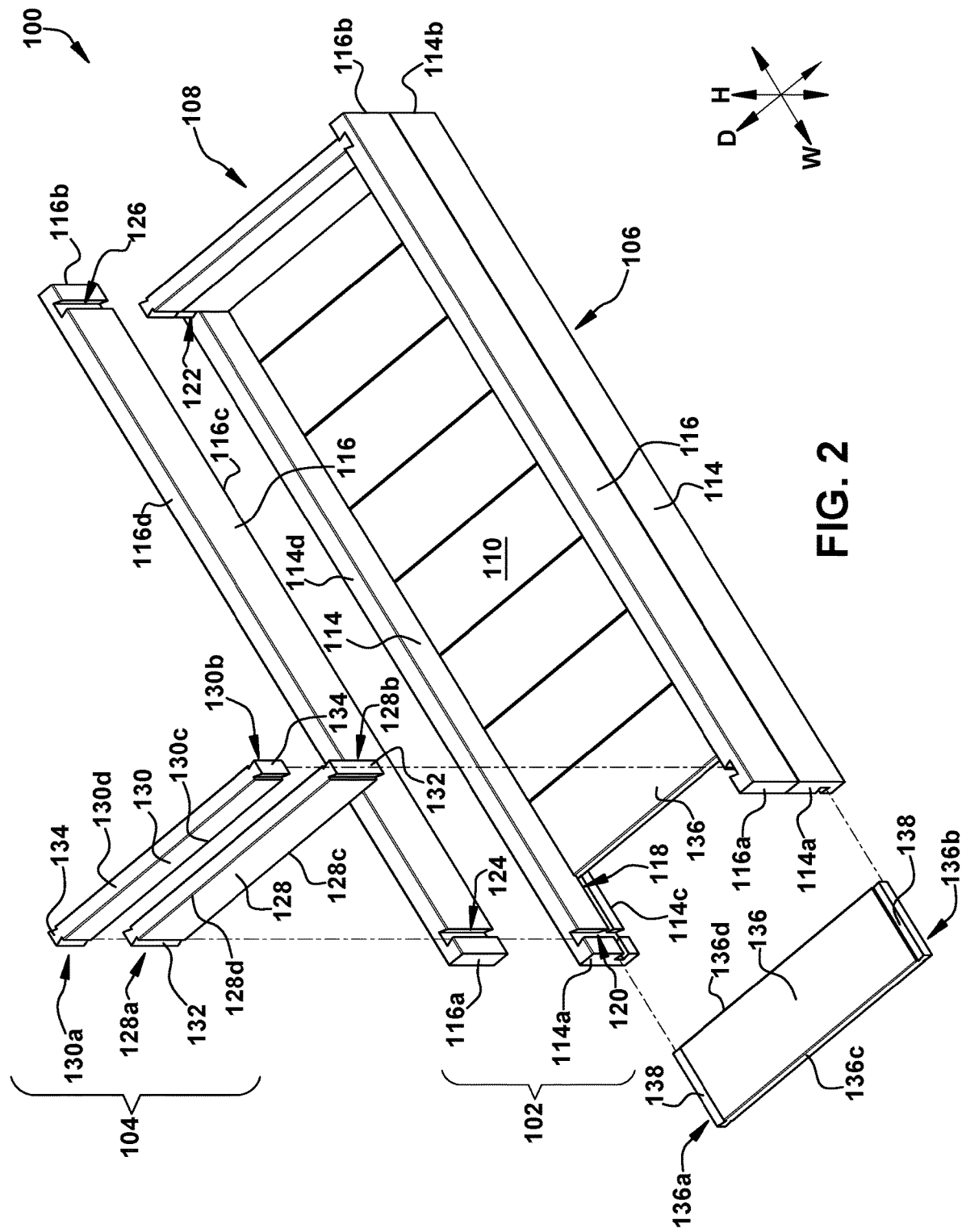
FIG. 2 is a perspective view of the planter box shown in FIG. 1, depicting a partially, exploded view thereof.

Referring now to FIG. 2, the planter box 100 is depicted in a partially, exploded view. As shown, the first side-wall 102 includes a base plank 114 and a top plank 116. In an assembled state, as will be discussed further below, the top plank 116 is aligned with and disposed vertically above the base plank 114 (i.e., in a stacked manner). The base plank 114 extends longitudinally in the width direction 'W' of the planter box 100 between opposite, first and second ends 114a, 114b. A first groove 118 is formed in the base plank 114 and extends longitudinally (in the width direction 'W') from the first end 114a to the second end 114b. That is, the first groove 118 is a cut-out formed in the base plank 114 and extends completely from the first end 114a to the second end 114b thereof.

Further, a second groove 120 is formed in the base plank 114, adjacent the first end 114a thereof, and extends longitudinally (in the height direction 'H' of the planter box 100) from a bottom end 114c to a top end 114d thereof. Accordingly, the second groove 120 intersects with (i.e., crosses over) the first groove 118. The second groove 120 may be perpendicular to the first groove 118. Alternatively, the first groove 118 and second groove 120 may meet at an angle less than, or preferably greater than, 90°. Notably the second groove 120 is spaced from the first end 114a. The spaced distance between the first end 114a and the second groove 120 is advantageous in that it maintains the structural integrity of the base plank 114 during and after assembly, as will be discussed below.

Moreover, a third groove 122 is formed in the base plank 114, adjacent the second end 114b thereof, and extends longitudinally (in the height direction 'H' of the planter box 100) from the bottom end 114c to the top end 114d thereof. Accordingly, like the second groove 120, the third groove 122 likewise intersects with the first groove 118 perpendicularly or at an angle. Also similar to the second groove 120, the third groove 122 is spaced from the second end 114b by the corresponding distance noted above. Preferably, the second and third grooves 120, 122 are arranged parallel with respect to one another (i.e., in the height direction 'H' of the planter box 100) and are arranged perpendicular to the first groove 118. Notably, the first groove 118 is spaced from the bottom end 114c of the base plank 114 to likewise maintain the structural integrity of the base plank 114 during and after assembly. The spacing between the first groove 118 and the bottom end 114c of the base plank 114 will be further discussed below.

Further, in the depicted example, the bottom end 114c of the base plank 114 is configured to rest on a supporting surface. That is, the bottom end 114c of the base plank 114 of the first side-wall 102 (as well as the corresponding bottom end of the base plank 114 of the third side-wall 106) is the engagement point between the assembled planter box 100 and a (preferably flat) supporting surface on which the planter box 100 sits. Notably, the supporting surface may be a floor, a table, a step, or any other structure where an end user wishes to place the planter box 100. Moreover, as will be further discussed below, legs (not shown) may be removably attached to the base plank 114 of the first side-wall 102 (as well as the corresponding base plank 114 of the third side-wall 106). In such instances, respective engagement surfaces of the legs (e.g., the surfaces physically resting on the supporting surface) constitute a bottom end of the first side-wall 102 (and the third side-wall 106). Accordingly, the bottom end 114c of the base plank 114 may rest directly on the supporting surface (i.e., direct physical contact therebetween) or may rest indirectly on the supporting surface (i.e., via the intermediate legs).

The top plank 116 of the first side-wall 102 likewise extends longitudinally (in the width direction 'W' of the planter box 100) between opposite, first and second ends 116a, 116b. As shown, fourth and fifth grooves 124, 126 are formed in the top plank 116 adjacent the first and second ends 116a, 116b, respectively, thereof. Similar to the base plank 114, each of the fourth and fifth grooves 124, 126 is provided at a spaced distance from its respective first or second end 116a, 116b. Further, each of the fourth and fifth grooves 124, 126 extends longitudinally (in the height direction 'H' of the planter box 100) from a bottom end 116c to a top end 116d thereof. Moreover, the fourth and fifth grooves 124, 126 are preferably oriented such that they are parallel to one another (i.e., both extending longitudinally in the height direction 'H' of the planter box 100), or alternatively, at an angle relative to the first groove 118. Notably, as will be discussed further below, when the top plank 116 is disposed (i.e., stacked) on the base plank 114, the second groove 120 and the fourth groove 124 are aligned with one another (e.g., aligned along a common vertical axis) and the third groove 122 and the fifth groove 126 are aligned with one another (e.g., along a separate, common vertical axis).

Notably, the base plank 114 and the top plank 116 of the first side-wall 102 have the same dimensions in the height 'H,' width 'W,' and depth 'D' directions of the planter box 100. However, it is contemplated that the base plank 114 and the top plank 116 could have varying dimensions with respect to one another in the height 'H,' width 'W,' and/or depth 'D' directions of the planter box 100. Moreover, it is to be understood that the first and third side-walls 102, 106 are substantially the same. That is, the first and third side-walls 102, 106 are mirror-images of one another in shape and configuration. Accordingly, the above-noted disclosure of the first side-wall 102 likewise applies to the third side-wall 106. Further, for brevity, it is to be understood that any further disclosure of the first side-wall 102 likewise applies to the third side-wall 106 unless stated otherwise.

As shown in FIG. 2, the design and configuration of the second side-wall 104 will now be discussed. Notably, the second and fourth side-walls 104, 108 are the same in both shape and configuration. Accordingly, for brevity, the below disclosure will be directed towards only the second side-wall 104 with the understanding that said disclosure likewise applies to the fourth side-wall 108. As shown in FIG. 2, the second side-wall 104 includes a base board 128 and a top board 130. In an assembled state, as will be discussed further below, the top board 130 is aligned with and disposed vertically above the base board 128 (i.e., in a stacked configuration). The base board 128 extends longitudinally in the depth direction 'D' of the planter box 100 between opposite, first and second ends 128a, 128b. A protrusion 132 is provided at each of the first and second ends 128a, 128b of the base board 128 and extends in the height direction 'H' of the planter box 100 between opposite bottom and top ends 128c, 128d, thereof. More specifically, each protrusion 132 extends completely from the bottom end 128c of the base board 128 to the top end 128d thereof.

With respect to FIG. 3, a partial, cross-sectional view of the base board 128 is shown. As depicted, the protrusion 132 has a dovetail shape including opposite, first and second surfaces 132a, 132b, and a third surface 132c. Notably, the first and second surfaces 132a, 132b lie on respective imaginary planes P1, P2 that converge (i.e., intersect) within a body of the base board 128. Moreover, the third surface 132c extends between the first and second surfaces 132a, 132b (e.g., is coterminous with outer-most edges of the first and second surfaces 132a, 132b) and is oriented perpendicular to a main side surface (i.e., a surface that partially defines the inner side-surface that partially bounds the storage cavity 112) of the base board 128. Notably, while only one of the protrusions 132 of the base board 128 is shown in FIG. 3, it is to be understood that the other protrusion 132 has the same shape. Moreover, it is to be understood that the protrusions 132 may have a different shape in cross-section so long as the shape of the protrusions 132 allows for assembly of the planter box 100 via mechanical connections and without need for glue or fasteners. For example, the protrusions 132 could have a circular shape in cross-section.

Figure 5:
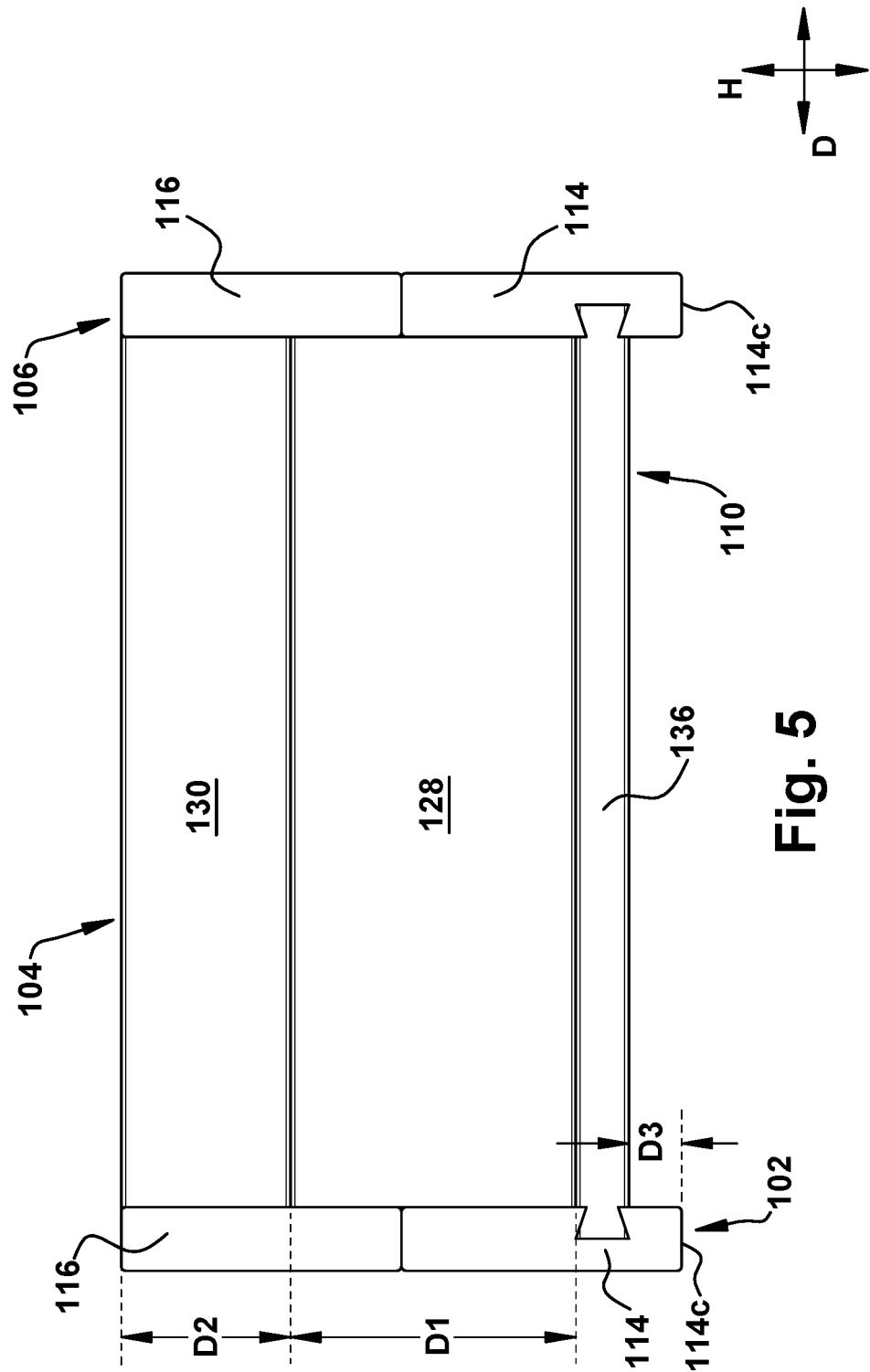
FIG. 5 is a side view of the planter box shown in FIG. 1.

Moving back to FIG. 2, the top board 130 of the second side-wall 104 is substantially the same as the base board 128 of the second side-wall 104. That is, the top board 130 extends longitudinally in the depth direction 'D' of the planter box 100 between opposite, first and second ends 130a, 130b and includes protrusions 134 provided at the first and second ends 130a, 130b, respectively, thereof. The protrusions 134 of the top board 130 are the same in cross-sectional shape (e.g., dovetail-shaped) as the protrusions 132 of the base board 128 and likewise extend in the height direction 'H' of the planter box 100 between opposite bottom and top ends 130c, 130d thereof. Notably, the only difference between the base board 128 and the top board 130 of the second side-wall 104 is their respective dimensions in the height direction 'H' of the planter box 100. Specifically, as shown in FIG. 5, the base board 128 spans a first distance D1 in the height direction 'H' of the planter box 100 and the top board 130 spans a second distance D2 in the height direction 'H' of the planter box 100, wherein the first distance D1 is greater than the second distance D2.

Moving back to FIG. 2, the bottom wall 110 comprises a plurality of panels 136 disposed adjacent one another and residing on a common imaginary plane. Each panel 136 extends longitudinally in the depth direction 'D' of the planter box 100 between opposite, first and second ends 136a, 136b and includes protrusions 138 provided at the first and second ends 136a, 136b, respectively, thereof. The protrusions 138 of each panel 136 are the same in cross-sectional shape (e.g., dovetail-shaped) as the protrusions 132 of the base board 128. Moreover, the protrusions of each panel 136 extend completely between opposite lateral ends 136c, 136d thereof in the width direction 'W' of the planter box 100.

As shown, a total of nine panels 136 collectively define the bottom wall 110. It is to be understood that the bottom wall 110 may be defined by a total number of panels 136 that is greater than or less than nine. Specifically, the total number of panels 136 used for a particular planter box 100 depends on the dimensions of the first and third side-walls 102, 106 thereof in the width direction 'W.' Further, each panel 136 can have the same dimensions in the height 'H,' width 'W,' and depth 'D' directions of the planter box 100 with respect to one another. However, it is contemplated that the panels 136 can have varying dimensions with respect to one another in the width 'W' direction of the planter box 100.

Notably, the aforementioned grooves (i.e., the first groove 118, the second groove 120, the third groove 122, the fourth groove 124, and the fifth groove 126) are shaped and dimensioned to receive a corresponding protrusion therein. Specifically, with reference to FIG. 4, a cross-sectional view of the base plank 114 of the first side-wall 102 is shown and depicts the first groove 118 as having a corresponding cross-sectional shape (e.g., dovetail-shape) with respect to the protrusion 132 shown in FIG. 3. It is to be understood that any/all of the aforementioned grooves may have any particular cross-sectional shape so long as it corresponds with a complementary shape of a respective protrusion and is dimensioned to permit the protrusion to be received therein. Notably, the respective dimensions between a protrusion and its corresponding groove may be such that the protrusion readily slides therein with ease (e.g., a clearance fit), or such that a user is required to apply a small amount of force in order to slide the protrusion into its corresponding groove (e.g., a push-fit). Once assembled, the protrusions should fit into their corresponding grooves with a mechanical connection so as to prevent racking or twisting of the final assembled planter box 100 without need for glues or fasteners. A preferred groove/protrusion joint is a sliding dovetail joint.

Reference will now be made with respect to assembly of the above-described planter box 100. It is to be understood that the below-described method of assembly is only one example of such, and that fewer or additional steps may be included. It is further contemplated that the below-noted steps need not occur in the exact order, as discussed.

With reference to FIG. 2, the planter box 100 is assembled by removably connecting the bottom wall 100 to each of the first and third side-walls 102, 106, and further by removably connecting each of the second and fourth side-walls 104, 108 to the first and third side-walls 102, 106. Notably, the removable connection is provided via sliding engagement of a protrusion within a corresponding groove. As will be further discussed below, this removable connection presents a modular design, wherein various dimensions (i.e., in the height direction 'H,' width direction 'W' and/or depth direction 'D') of the planter box 100 can be adjusted by an end user (e.g., after first purchasing the planter box 100) by adding or subtracting various elements or by substituting various elements.

The method of assembly can begin by first connecting each panel 136 of the plurality of panels to the base plank 114 of the first side-wall 102. Specifically, this is accomplished by sliding the protrusion 138 at the first end 136a of each panel 136 within the first groove 118 in the width direction 'W' of the planter box 100. This step is repeated for each panel 136 until the plurality of panels generally span from the first end 114a of the base plank 114 to the second end 114b thereof. Notably, each panel 136 can be in physical contact with an adjacent panel such that there are no gaps (i.e., in the width direction 'W' of the planter box 100) provided in the bottom wall 110. Alternatively, the plurality of panels 136 can be spaced from one another (i.e., in the width direction 'W' of the planter box 100) such that gaps are defined therebetween (e.g., to permit draining). Next, each panel 136 of the plurality of panels is connected to the base plank 114 of the third side-wall 106. This occurs in substantially the same manner as noted above (i.e., by sliding the protrusion 138 at the second end 136b of each panel 136 within the first groove 118 in the width direction 'W' of the planter box 100.

Subsequently, the top plank 116 of the first side-wall 102 is arranged above the base plank 114 of the first side-wall 102 such that the top plank 116 is stacked (in the height direction 'H' of the planter box 100) on top of the base plank 114. Notably, when assembled, the bottom end 116c of the top plank 116 can physically contact (i.e., rest on) the top end 114d of the base plank 114 such that there is no gap (i.e., in the height direction 'H' of the planter box 100) therebetween. Alternatively, the base plank 114 and the top plank 116 can be slightly spaced from one another such that a gap is defined therebetween. Moreover, in the assembled position, the second groove 120 and the fourth groove 124 of the base plank 114 and the top plank 116, respectively, are aligned with one another along a common axis (i.e., aligned in the height direction 'H' of the planter box 100). Similarly, the third groove 122 and the fifth groove 126 of the base plank 114 and the top plank 116, respectively, are aligned in the same manner. Notably, after the top plank 116 of the first side-wall 102 is arranged above its corresponding base plank 114, the top plank 116 of the third side-wall 106 is arranged above the base plank 114 of the third side-wall 106 in the same manner.

Thereafter, the base board 128 of the second side-wall 104 is assembled with respect to each of the first and third side-walls 102, 106. Specifically, the base board 128 is arranged above the top plank 116 of each of the first and third side-walls 102, 106 such that the protrusions 132 at the first and second ends 128a, 128b are aligned with their corresponding grooves in the top plank 116 and the base plank 114. More specifically, the protrusion 132 at the first end 128a of the base board 128 is aligned (vertically) with the second groove 120 and the fourth groove 124 of the base plank 114 and the top plank 116, respectively, of the first side-wall. Thereafter, the base board 128 is translated downwards such that the protrusion 132 at the first end 128a thereof is received within the fourth groove 124 of the top plank 116 and continues to translate (vertically downwards) until said protrusion 132 is received within the second groove 120 of the base plank 114. Notably, as this occurs, the protrusion 132 at the second end 128b of the base board 128 simultaneously translates within the respective, corresponding grooves formed in the top plank 116 and the base plank 114 of the third side-wall 106.

As mentioned above, the second groove 120 may span the entire distance from the bottom end 114c to the top end 114d of the base plank 114. It is to be understood that when the base board 128 is in the assembled state, the base board 128 does not span the entire vertical distance (i.e., in the height direction 'H' of the planter box 100) of the second groove 120. Rather, the base board 128 rests on (e.g., physically contacts) the bottom wall 110 (e.g., one of panels 136) of the planter box 100 and thus only extends part of the vertical distance of the base board 128. Moreover, it is noted that in the assembled state, the base board 128 extends adjacent both the base plank 114 and the top plank 116 of the first side-wall 102. That is, the protrusion 132 at the first end 128a of the base board 128 is received within both the second groove 120 of the base plank 114 and the fourth groove 124 of the top plank 116 in its assembled state.

Thereafter, the top board 130 of the second side-wall 104 is connected to the first and third side-walls 102, 106 in the same manner noted above. That is, the protrusions 134 at each end of the top board 130 are translated and received within their respective fourth grooves 124 formed in their corresponding top planks 116. Again, it is to be understood that in the assembled state, the top board 130 can rest (i.e., physically contact) on the base board 128 such that there is no gap disposed therebetween. Alternatively, the top board 130 may be spaced from the base board 128 such that a gap exists therebetween.

Finally, the fourth side-wall 108 is connected to the first and third side-walls 102, 106 in the same manner noted above with respect to the second side-wall 104. That is, base board 128 of the fourth side-wall 108 is translated vertically downwards such that its protrusions 132 are mechanically received within their associated third groove 122 and the fifth groove 126 of the corresponding base plank 114 and top plank 116, respectively, of the first and third side-walls 102, 106. Finally, the top board 130 of the fourth side-wall 108 is translated vertically downwards such that the protrusions 134 at each end thereof are translated and received within their respective fifth grooves 126 formed in their corresponding top planks 116.

Now moving to FIG. 5, in the assembled state, an upper edge of the second side-wall 104 (and the fourth side-wall 108, not shown in FIG. 5) sits flush with respective upper edges of the first and third side-walls 102, 106. As noted above, the respective base boards 128 of the second and fourth side-walls 104, 108 rest on the bottom wall 110 in the assembled state. Accordingly, an overall distance of each of the second and fourth side-walls 104, 108 in the height direction 'H' is less than an overall distance of each of the first and third side-wall 102, 106 in the height direction 'H' in order to permit the respective upper edges of the second and fourth side-walls 104, 108 to sit flush with the respective upper edges of the first and third side-walls 102, 106. For example, as shown in FIG. 5, each base board 128 of the second and fourth side-walls 104, 108 is taller (i.e., in the height direction 'H') than the respective top boards 130 of the second and fourth side-walls 104, 108. Alternatively, it is contemplated that each top board 130 of the second and fourth side-walls 104, 108 is taller (i.e., in the height direction 'H') than the respective base boards 128 of the second and fourth side-walls 104, 108 or that the top boards 130 of the second and fourth side-walls 104, 108 are equal in height so long as the top edges of the planter box are flush and meet at the same height.

Importantly, the bottom wall 110 of the planter box 100 does not sit flush with respective bottom edges of the first and third side-walls 102, 106 (i.e., edges of the first and third side-walls 102, 106 configured to come in contact with a supporting surface when placed by a user). That is, the panels 136 of the bottom wall 110 are not flush with the respective bottom ends 114c of the base planks 114 of the first and third side-walls 102, 106, and do not rest on or contact the supporting surface. Rather, the bottom wall 110 is vertically spaced (i.e., in the height direction 'H' of the planter box) from the respective bottom edges of the first and third side-walls 102, 106 by a third distance D3 (e.g., 0.75-4.0 cm, preferably 1.5-2.0 cm). Providing this spaced distance (i.e., the third distance D3) is important for maintaining the structural integrity of the respective base planks 114 of the first and third side-walls 102, 106. Specifically, arranging the bottom wall 110 at the respective bottom edges of the first and third side-walls 102, 106 would result in the first groove 118 in each of the base planks 114 being disposed at or closely adjacent to the respective bottom ends 114c of the base planks 114. Forming a groove at or closely adjacent to the bottom end 114c of the base plank 114 would weaken the surrounding structure, as there is less surrounding material to receive distributed forces applied by the bottom wall 110. That is, the applied force (e.g., weight) of the bottom wall 110 would be distributed and concentrated at a point of least material in the base plank 114 (i.e., near the bottom end 114c) and cause failure (i.e., breaking) thereat. Accordingly, spacing the bottom wall 110 from the bottom end 114c of the base planks 114 by the third distance D3 ensures that there is sufficient material between the first groove 118 and the bottom end 114c to distribute the applied force and prohibit/prevent failure.

Figure 6:
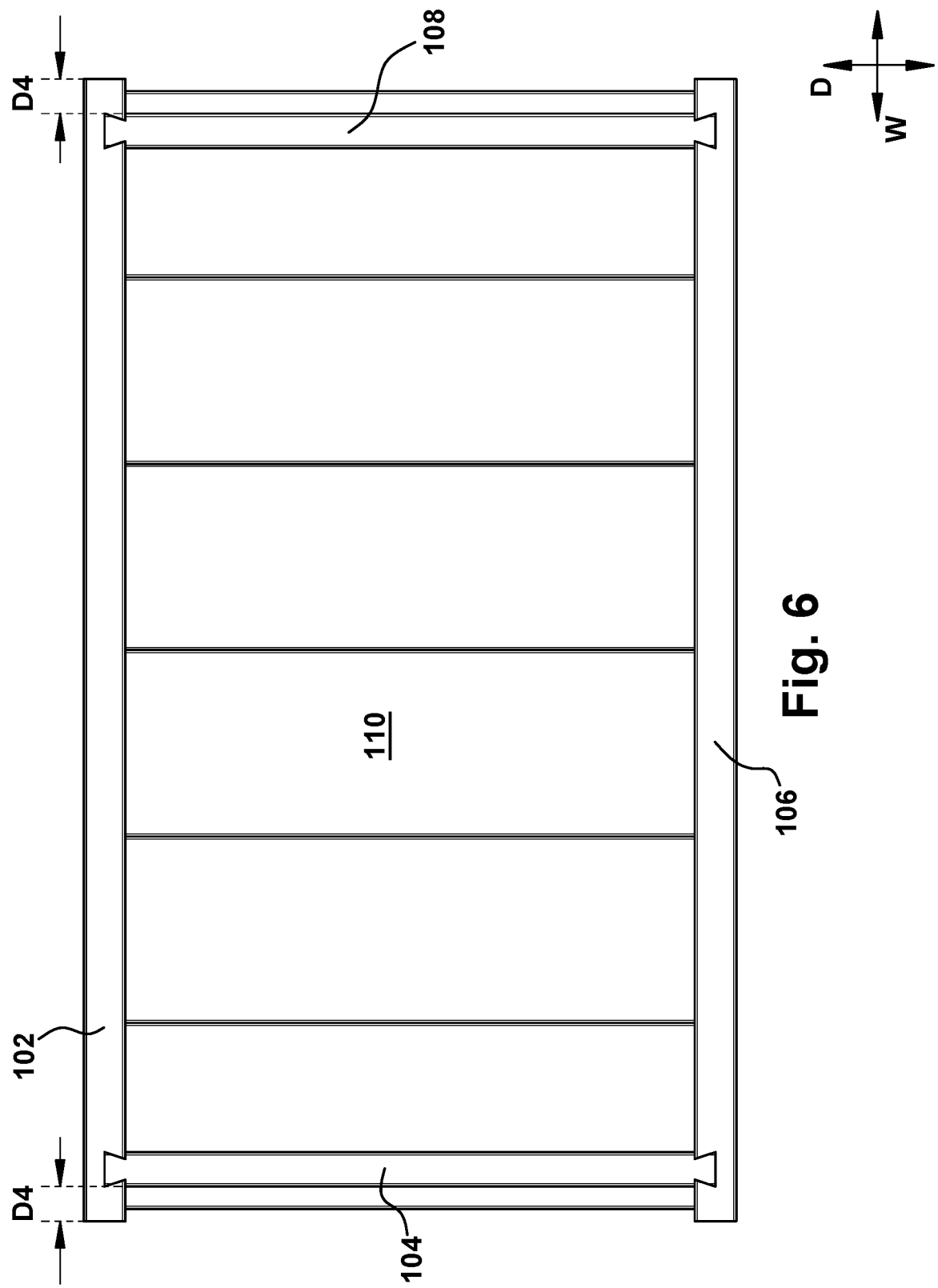
FIG. 6 is a top view of the planter box shown in FIG. 1.

Similarly, with respect to FIG. 6, the second side-wall 104 of the planter box 100 does not sit flush with respective lateral edges of the first and third side-walls 102, 106. That is, neither the base board 128 nor the top board 130 sits flush with the respective first ends 114a, 116a of the base plank 114 and the top plank 116, respectively, of the first side-wall 102 and the third side-wall 106. Rather, the second side-wall 104 is laterally spaced (i.e., in the width direction 'W' of the planter box 100) from the lateral edge of the first side-wall 102 (as well as the lateral edge of the third side-wall 106) by a fourth distance D4 (e.g., 0.75-5.0 cm, and preferably 1.75-2.25 cm). Again, this spaced distance (i.e., the fourth distance D4) is important for maintaining the structural integrity of the corresponding lateral ends of the first and third side-walls 102, 106, respectively. That is, spacing the second side-wall 104 from said lateral ends of the first and third side-walls 102, 106, respectively, by the fourth distance D4 ensures that there is sufficient material between the corresponding grooves and said lateral ends to prohibit/prevent failure. Notably, the above spacing and disclosure likewise applies to the fourth side-wall 108, as shown in FIG. 6.

As briefly mentioned above, legs (not shown) may be removably connected to the respective base planks 114 of the first side-wall 102 and the third side-wall 106. As noted above, each of the first and second grooves 120, 122 extend completely from the bottom end 114c to the top end 114d of the base plank 114 (in the height direction 'H' of the planter box 100). Accordingly, in the assembled state, each leg (not shown) may be removably connected to the base plank 114 by inserting a dovetail-shaped protrusion into an unoccupied portion of the first or second groove 120, 122. That is, a leg (not shown) may be inserted into the portion of the first or second groove 120, 122 disposed vertically below the bottom wall 110 (in the height direction 'H' of the planter box 100). Adding a (removable) pair of legs to each of the respective base planks 114 of the first side-wall 102 and the third side-wall 106 increases the distance of the storage cavity 112 (e.g., the bottom wall 110) from the supporting surface. Accordingly, the removable legs permit a user to choose a desired height of the storage cavity 112 from the supporting surface for easier accessibility, or even for desired aesthetics.

Figure 7:
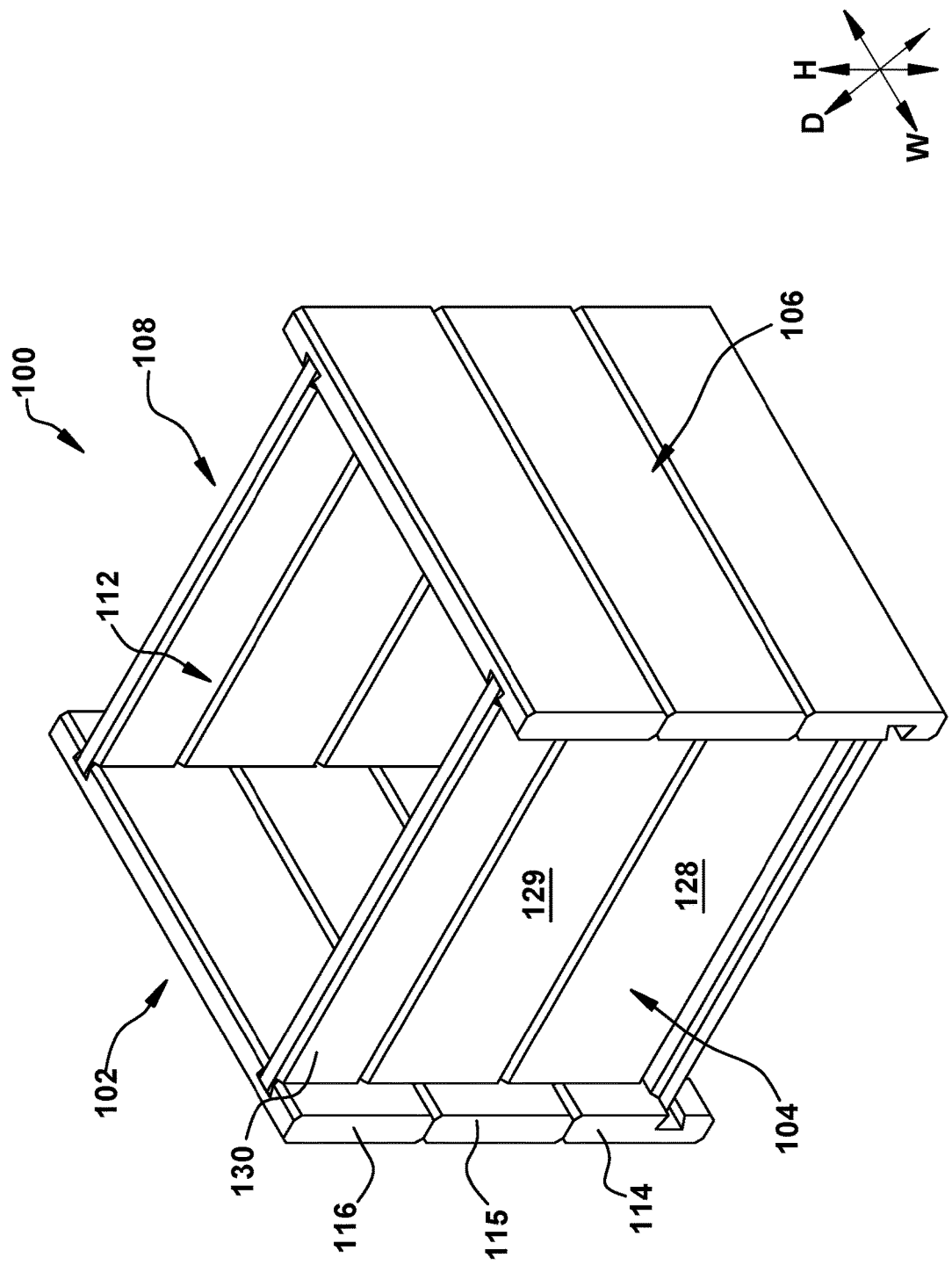
FIG. 7 is a perspective view of an alternative opened-top, planter box.

Now moving on to FIG. 7, a second embodiment of a planter box 100 is shown. As noted above, the planter box 100 is modularly designed such that various parts (e.g., boards, planks, panels) of the first, second, third, and fourth side-walls 102, 104, 106, 108, and the bottom wall 110 can be added or subtracted by a user to achieve a planter box 100 with desired dimensions (i.e., in the height 'H,' width 'W,' and/or depth 'D' directions). For example, with respect to FIG. 7, each of the first and third side-walls 102, 106 includes an intermediate plank 115 disposed vertically between (i.e., in the height direction 'H') the base plank 114 and the top plank 116. Similarly, each of the second and fourth side-walls 104, 108 includes an intermediate board 129 disposed vertically between the base board 128 and the top board 130. The addition of the intermediate planks 115 and the intermediate boards 129 increases the overall height of the storage cavity 112.

As described above, the modular planter box 100 is quickly assembled by sliding protrusions (e.g., of the boards or panels) into corresponding grooves. Accordingly, the planter box 100 can be quickly assembled by an end user without the use of tools and/or fasteners. Further, the planter box 100 can be shipped from the manufacturer to either an intermediary seller or a customer in a completely unassembled state, thus decreasing the overall footprint of the packaging materials. Moreover, as noted above, each of the first, second, third, and fourth side-walls 102, 104, 106, 108, and the bottom wall 110 can be constructed of wood (e.g., pine, spruce, fir, oak, redwood, etc.). In some aspects, the wood is a moisture resistant or rot resistant wood such as cedar or teak. Alternatively, the first, second, third, and fourth side-walls 102, 104, 106, 108, and the bottom wall 110 can be constructed of a PVC material such as AZEK®. Notably, the corners of each element of the above-noted walls can be chamfered or rounded to improve the overall feel/aesthetics of the planter box 100. Decorative or ornamental elements may also be added.

Further still, it is contemplated that each plank of the first and third side-walls 102, 106 can be identical to the base plank 114 (e.g., depicted in FIG. 2). Accordingly, in such examples, each plank would include two, vertically oriented grooves disposed adjacent respective, opposite ends thereof, as well as a horizontally oriented groove (e.g., the first groove 118) extending horizontally between said opposite ends and intersecting the two, vertically oriented grooves. In such examples, additional panels 136 may be disposed between upper rows of the planks. For example, with respect to FIG. 2, if each of the respective top planks 116 of the first and third side-walls 102, 106 includes the corresponding horizontal groove (e.g., the first groove 118), then at least one panel 136 could be received within said corresponding horizontal grooves in order to extend (e.g., in the depth direction 'D') between the respective top planks 116 of the first and third side-walls 102, 106. The inclusion of this additional panel 136 extending between the top planks 116 can increase structural rigidity of the planer box 100 and hinder warpage of the side-walls, or could serve as an ornamental feature to give the appearance of two individual planter boxes.

The invention has been described with reference to the example embodiments described above. Modifications and alterations will occur to others upon a reading and understanding of this specification. Example embodiments incorporating one or more aspects of the invention are intended to include all such modifications and alterations insofar as they come within the scope of the appended claims.

What is claimed is:

1. A modular planter box, comprising:
   a first side-wall extending longitudinally in a first direction and having a bottom end configured to rest on a supporting surface, said first side-wall including a base plank and a top plank;
   a second side-wall extending longitudinally in a second direction, said second direction being perpendicular to the first direction, said second side-wall including a base board and a top board;
   a third side-wall spaced from the first side-wall and extending longitudinally in the first direction;
   a fourth side-wall spaced from the second side-wall and extending longitudinally in the second direction; and
   a bottom wall residing on an imaginary horizontal plane, said bottom wall including a panel having a first protrusion formed at an end thereof,
   wherein said second side-wall extends in a third direction that is normal to said imaginary horizontal plane,
   wherein the first side-wall, the second side-wall, the third side-wall, the fourth side-wall, and the bottom wall collectively define a storage cavity configured to receive a planting medium therein,
   wherein the bottom wall spans between and is removably connected to the first side-wall and the third side-wall, and the second side-wall and the fourth side-wall span between and are removably connected to the first side-wall and the third side-wall,
   wherein the bottom wall is spaced from the bottom end of the first side-wall in the third direction and towards an opposite, top end of the first side-wall,
   wherein the base plank has first and second grooves formed therein, said first groove extending longitudinally in the first direction, and said second groove extending longitudinally in the third direction,
   wherein the first protrusion is slidingly received within the first groove to removably connect the bottom wall to the first side-wall,
   wherein the top plank is disposed above the base plank in the third direction,
   wherein the top plank has a third groove formed therein, said third groove being vertically aligned with the second groove,
   wherein the base board rests on a top surface of the panel and extends beyond a top edge of the base plank in the third direction,
   wherein the base board has a second protrusion formed at an end thereof, wherein the second protrusion is slidingly received within the second groove and the third groove,
   wherein the top board is disposed above the base board in the third direction, wherein the top board has a third protrusion formed at an end thereof, and wherein the third protrusion is slidingly received within the third groove, and
   wherein the base board spans a first distance in the third direction, and wherein the top board spans a second distance in the third direction, wherein said first and second distances are different.

2. The modular planter box of claim 1, wherein the first side-wall extends longitudinally between opposite, first and second ends, wherein the second side-wall is positioned closer to the first end than the second end, and wherein the second side-wall is spaced from the first end of the first side-wall in the first direction and towards the second end of the first side-wall.

3. The modular planter box of claim 2, wherein the second side-wall is spaced from the first end of the first side-wall by a distance between 1.75 cm-2.25 cm.

4. The modular planter box of claim 3, wherein the bottom wall is spaced from the bottom end of the first side-wall by a distance between 1.5 cm-2.0 cm.

5. The modular planter box of claim 1, wherein the base plank extends longitudinally between opposite, first and second ends, and wherein the first groove extends completely from the first end to the second end.

6. The modular planter box of claim 1, wherein the first protrusion has a dovetail shape and the first groove has a corresponding shape to permit the protrusion to slide therein.

7. The modular planter box of claim 1, wherein the second groove crosses over the first groove in a perpendicular manner.

8. The modular planter box of claim 7, wherein the base plank extends in the third direction between opposite, bottom and top edges, wherein the bottom edge is the bottom end of the first side-wall, and wherein the second groove extends completely from the bottom edge to the top edge of the base plank.

9. The modular planter box of claim 1, wherein the first side-wall, the second side-wall, the third side-wall, the fourth side-wall, and the bottom wall are made of wood.

10. The modular planter box of claim 1, wherein the planter box comprises a material selected from the group consisting of cedar, teak, polyvinyl chloride, or combinations thereof.

11. The modular planter box of claim 1, wherein the first distance is larger than the second distance.

12. The modular planter box of claim 1, wherein a top edge of the top plank is flush with a top edge of the top board.

13. A modular planter box defining a storage cavity therein that is configured to receive a planting medium, the modular planter box comprising:
    a first side-wall extending longitudinally in a first direction and including a base plank and a top plank, said base plank configured to rest on a supporting surface and said top plank being provided vertically above the base plank;
    a second side-wall extending longitudinally in a second direction, said second direction being perpendicular to the first direction, the second side-wall including a base board and a top board, the top board being disposed vertically above and resting on the base board; and
    a bottom wall residing on an imaginary horizontal plane, the base board resting on a top surface of the bottom wall and extending in a third direction that is normal to said imaginary horizontal plane,
    wherein the base plank includes a first groove and a second groove formed therein, the first groove extending longitudinally in the first direction from a first lateral end to a second lateral end of the base plank, the second groove extending longitudinally in the third direction from a bottom edge to an opposite top edge of the base plank, and wherein the second groove crosses over the first groove in a perpendicular manner, wherein the top plank includes a third groove formed therein, said third groove extending longitudinally in the third direction and being vertically aligned with the second groove, wherein the bottom wall has a first protrusion formed at an end thereof, said first protrusion being slidably received within the first groove to removably connect the bottom wall to the first side-wall, wherein the base board has a second protrusion formed at an end thereof, said second protrusion being slidably received within the second groove and the third groove, wherein the top board has a third protrusion formed at an end thereof, said third protrusion being slidably received within the third groove, wherein the bottom edge of the base plank is configured to rest on the supporting surface, and wherein the bottom wall is spaced from the bottom edge of the base plank in the third direction and towards the top edge of the base plank, wherein the second side-wall is positioned closer to the first lateral end of the base plank than the second lateral end of the base plank, and wherein the second side-wall is spaced from the first lateral end of the base plank in the first direction and towards the second lateral end of the base plank, and wherein the base board spans a first distance in the third direction, wherein the top board spans a second distance in the third direction, wherein said first distance is larger than said second distance, and wherein a top edge of the top plank is flush with a top edge of the top board.

14. The modular planter box of claim 13, further comprising:

a third side-wall spaced from the first side-wall and extending longitudinally in the first direction; and a fourth side-wall spaced from the second side-wall and extending longitudinally in the second direction, wherein the first side-wall and the third side-wall are arranged parallel to one another and the second side-wall and the fourth side-wall are arranged parallel to one another, and wherein the bottom wall spans between and is removably connected to the first side-wall and the third side-wall, and wherein the second side-wall and the fourth side-wall span between and are removably connected to the first side-wall and the third side-wall.

* * * * *